US011454331B2

(12) United States Patent
Correll

(10) Patent No.: US 11,454,331 B2
(45) Date of Patent: Sep. 27, 2022

(54) VALVE CAP ASSEMBLY

(71) Applicant: Invent Form LLC, Hershey, PA (US)

(72) Inventor: Michael Anthony Correll, Hershey, PA (US)

(73) Assignee: Form Create LLC, Hershey, PA (US)

( * ) Notice: Subject to any disclaimer, the term of this patent is extended or adjusted under 35 U.S.C. 154(b) by 101 days.

(21) Appl. No.: 17/123,211

(22) Filed: Dec. 16, 2020

(65) Prior Publication Data

US 2021/0190227 A1    Jun. 24, 2021

Related U.S. Application Data

(60) Provisional application No. 62/949,875, filed on Dec. 18, 2019, provisional application No. 63/036,604, filed on Jun. 9, 2020.

(51) Int. Cl.
*F16K 15/20* (2006.01)
*F16K 27/08* (2006.01)
*B60C 29/06* (2006.01)

(52) U.S. Cl.
CPC ............ *F16K 27/08* (2013.01); *B60C 29/066* (2013.01); *F16K 15/205* (2013.01); *Y10T 137/374* (2015.04)

(58) Field of Classification Search
CPC ....... B60C 29/066; B60C 29/06; F16K 27/08; F16K 15/20; F16K 15/205; Y10T 137/374; Y10T 137/7058; Y10T 137/7062; Y10T 137/3584–3786; Y10T 24/1408; B65D 47/0842; B65D 47/148
USPC ...... 137/223–234.5, 381, 382, 800; 222/554, 222/563, 206, 212, 213; 215/306, 354, 215/355, 228, 209, 211, 315; 138/89, 138/89.1, 89.2, 89.3, 89.4; 152/415–431, 152/DIG. 13; 220/375, 744, 746, 220/724–728, 554, 563, 206, 212; 301/37.39, 37.41
See application file for complete search history.

(56) References Cited

U.S. PATENT DOCUMENTS

| 1,512,662 | A |   | 10/1924 | Atkinson et al. |            |
|-----------|---|---|---------|-----------------|------------|
| 1,881,362 | A |   | 10/1932 | Kimball         |            |
| 2,963,046 | A | * | 12/1960 | Goodrich        | B60C 29/066 |
|           |   |   |         |                 | 152/431    |
| 2,991,913 | A | * | 7/1961  | Goth            | B65D 51/18 |
|           |   |   |         |                 | 222/153.06 |
| 3,124,281 | A | * | 3/1964  | Stull           | B65D 47/148 |
|           |   |   |         |                 | 222/542    |

(Continued)

FOREIGN PATENT DOCUMENTS

DE        29913135 U1 * 10/1999  .......... B60C 29/066
WO    20190240536 A1   12/2019

*Primary Examiner* — Craig J Price
(74) *Attorney, Agent, or Firm* — Hooker & Habib, P.C.

(57) ABSTRACT

A valve cap assembly for being attached to an air valve and removably covering an end of the air valve includes a hoop, a cap, and an arched tether connecting the hoop and the cap. The hoop attaches the valve cap assembly to the air valve. The cap removably covers the end of the air valve to protect the end of the air valve. Both the hoop and the cap form a dependable interference fit between the hoop or cap and the valve stem to retain the hoop on the valve stem and to retain the cap covering the end of the air valve on the air valve. The cap includes one or more longitudinal protrusions that form the interference fit.

11 Claims, 8 Drawing Sheets

(56) References Cited

U.S. PATENT DOCUMENTS

| | | | | |
|---|---|---|---|---|
| 3,147,824 A * | 9/1964 | Henderson | F16N 21/06 | 184/88.1 |
| 3,209,963 A * | 10/1965 | Krieps | B65D 47/148 | 222/543 |
| 3,306,483 A * | 2/1967 | Bellafiore | B65D 35/42 | 24/304 |
| 4,239,184 A | 12/1980 | Dudar | | |
| 4,307,748 A * | 12/1981 | Mathias | F16L 57/005 | 251/351 |
| 5,195,561 A | 3/1993 | Wilson | | |
| 5,295,599 A * | 3/1994 | Smith | B01L 3/50825 | 215/204 |
| 5,327,862 A * | 7/1994 | Bedi | B01D 35/306 | 123/196 R |
| 5,417,247 A * | 5/1995 | Tarui | B60T 11/30 | 137/381 |
| 5,513,768 A * | 5/1996 | Smith | B65D 55/16 | D9/446 |
| 5,863,791 A * | 1/1999 | Baldszun | B01L 3/50825 | 422/561 |
| 6,119,714 A | 9/2000 | Otzen | | |
| 6,783,025 B2 * | 8/2004 | Lohn | B01L 3/50825 | 220/806 |
| 7,051,753 B1 * | 5/2006 | Caires | B65D 47/141 | 137/232 |
| 7,748,579 B1 * | 7/2010 | Shin | G01F 11/261 | 222/450 |
| 8,051,879 B2 * | 11/2011 | Zeyfang | F16L 57/005 | 215/256 |
| 8,281,799 B2 * | 10/2012 | Lien | F16K 15/202 | 137/228 |
| 8,292,101 B1 * | 10/2012 | Bragg | B65D 47/0838 | 215/237 |
| 8,438,597 B2 * | 5/2013 | Asahara | H04H 60/13 | 725/39 |
| 8,584,695 B2 * | 11/2013 | Lau | F16K 15/202 | 137/232 |
| 8,875,842 B2 * | 11/2014 | Willems | F16N 21/06 | 184/88.2 |
| 9,079,465 B1 * | 7/2015 | Sanftleben | B60D 1/58 | |
| 9,115,823 B1 | 8/2015 | Smith et al. | | |
| 9,272,586 B2 | 3/2016 | Durr | | |
| D753,998 S * | 4/2016 | Murphey | D9/446 | |
| 9,505,334 B2 | 11/2016 | Maness et al. | | |
| D797,555 S * | 9/2017 | Carlson | D9/446 | |
| 10,161,537 B2 | 12/2018 | Maness et al. | | |
| 10,189,321 B2 | 1/2019 | Bafana et al. | | |
| 2004/0065669 A1 * | 4/2004 | Giraud | B65D 43/162 | 220/839 |
| 2004/0182864 A1 * | 9/2004 | Hagano | B60K 15/0406 | 220/375 |
| 2008/0196768 A1 * | 8/2008 | Steffan | F16L 55/1152 | 137/232 |
| 2010/0147629 A1 * | 6/2010 | Joss | F16N 21/06 | 184/105.3 |
| 2017/0361668 A1 | 12/2017 | Bafana et al. | | |
| 2018/0093436 A1 | 4/2018 | Lamgaday et al. | | |
| 2018/0126799 A1 | 5/2018 | Gobinath et al. | | |
| 2018/0141395 A1 | 5/2018 | Garn et al. | | |
| 2019/0113145 A1 | 4/2019 | Maness et al. | | |

* cited by examiner

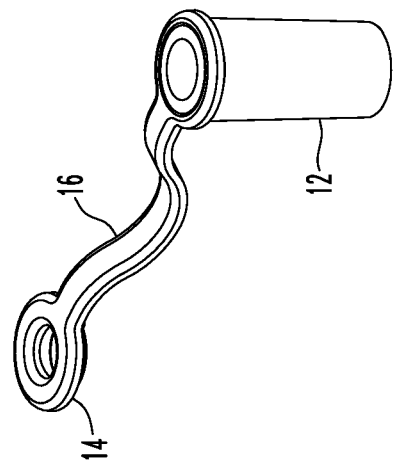
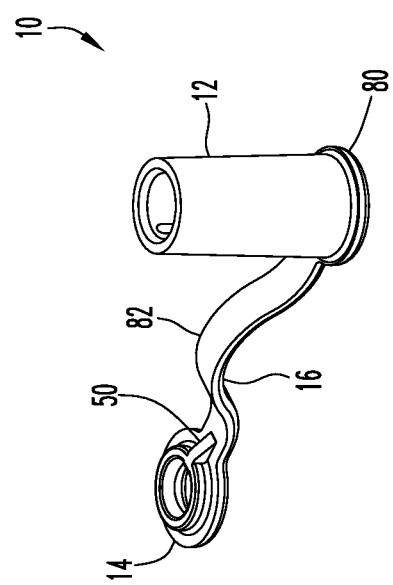

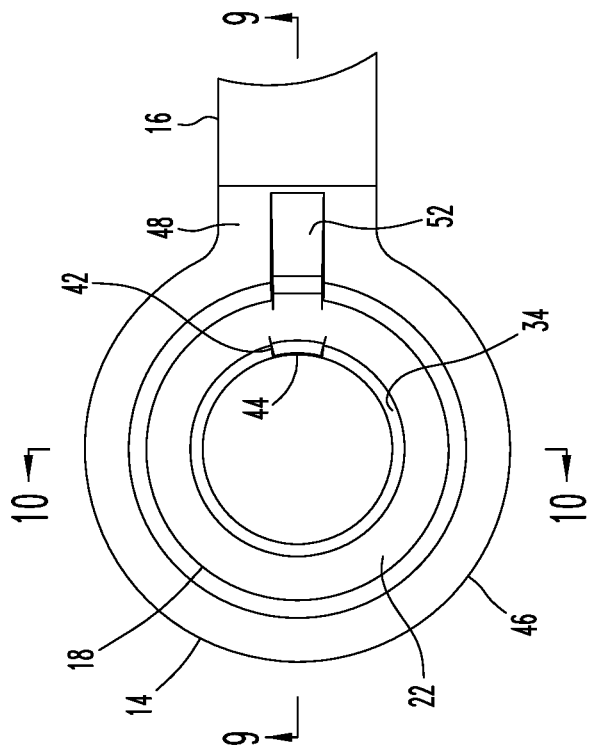
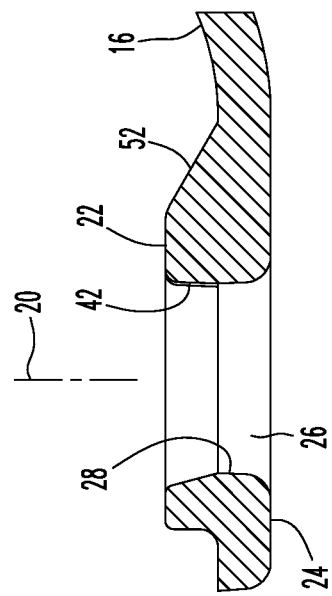
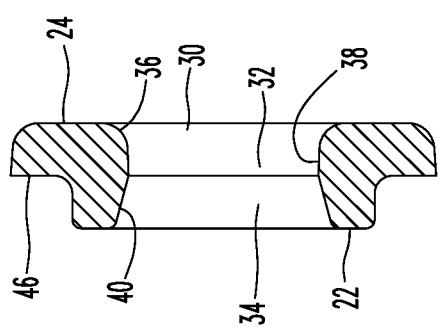
FIG. 8
FIG. 9
FIG. 10

VALVE CAP ASSEMBLY

RELATED APPLICATIONS

This application claims priority to and the benefit of the filing dates of U.S. Provisional Patent Application No. 62/949,875 "Valve Cap Retainer" filed Dec. 18, 2019 and U.S. Provisional Patent Application No. 63/036,604 "Valve Cap Retainer" filed Jun. 9, 2020, each of the priority applications being incorporated by reference as if fully set forth herein.

FIELD OF THE DISCLOSURE

The disclosure relates generally to caps for protecting the exposed ends of air valves on pneumatic tires, and in particular, to a valve cap assembly that removably attaches the cap to the air valve.

BACKGROUND OF THE DISCLOSURE

An air valve for a pneumatic tire of a bicycle, automobile, or other wheeled vehicle is used to inflate the tire through a hollow stem extending from the tire to an exposed end. A valve disposed in the end of the stem is opened to flow pressurized air into the tire and then re-closed to retain tire pressure.

An air valve is provided with a removable cap placed over the upper end of the stem to protect the valve during use of the wheeled vehicle. The cap also prevents road dirt and debris from interfering with proper operation of the valve.

Some bicycle tires are typically inflated to 5.5-9.0 Bar (80-130 PSI), which requires at least weekly filling during the riding season. The cap must be removed to inflate the tire. Loss of the cap after inflating the tire is common, whether by misplacing the cap or by forgetting to place the cap back on the air valve.

Caps that are tethered to a wheel spoke or to the air valve of a bicycle are available that reduce the risk of loss of the cap after inflating the tire. See, for example, the tethered cap device disclosed in Wilson, U.S. Pat. No. 5,195,561. The Wilson cap has protrusions that interact with external threads on the air valve. Protrusions can extend into the valleys between adjacent threads and so make the cap difficult to remove from the air valve.

Yet other known caps may come off the valve stem while the bicycle is being ridden, or have tethers that are too short and stretching the tether requires so much force that the entire cap device may be pulled off the air valve. Thus there is a need for an improved removable valve cap assembly that more reliably retains the cap and the valve cap assembly on the valve stem when riding the bicycle, while still allowing easy placement of the cap on the air valve and easy removal of the cap off the air valve.

SUMMARY OF THE DISCLOSURE

Disclosed is a valve cap assembly that is attached to an air valve and includes a cap that removably covers an end of the air valve of a pneumatic wheeled vehicle, a hoop that attaches to the air valve, and a tether joining the cap and the hoop. Both the cap and the hoop include interference features that dependably retain the hoop and cap on the air valve.

The cap includes protrusions that form interference fits with the air valve while the cap is over the end of the air valve. The protrusions extend in a longitudinal direction along the air valve for a distance substantially greater than the interference.

The interference features are deformed by the valve stem to generate forces applied by the cap and the hoop to the stem that resist axial movement of the cap and hoop along the valve stem.

Embodiments of the tether include an arch or curved portion that extends along a side of the air valve when the cap is placed over the end of the air valve but can be stretched or "flattened" to enable the cap to be removed from the air valve or reinstalled onto the air valve.

Other objects and features of the disclosure will become apparent as the description proceeds, especially when taken in conjunction with the accompanying drawing sheets illustrating one or more illustrative embodiments.

BRIEF DESCRIPTION OF THE DRAWINGS

FIG. 1 is a first perspective view of a first embodiment valve cap assembly in accordance with the present disclosure.

FIG. 2 is a second perspective view of the valve cap assembly shown in FIG. 1.

FIG. 8 is a plan view of the hoop of the valve cap assembly as shown in FIG. 4.

FIG. 9 is a sectional view taken along lines 9-9 of FIG. 8.

FIG. 10 is a sectional view taken along lines 10-10 of FIG. 8.

FIG. 11A is an enlarged view of the area A identified in FIG. 11.

DETAILED DESCRIPTION

Figure 4:
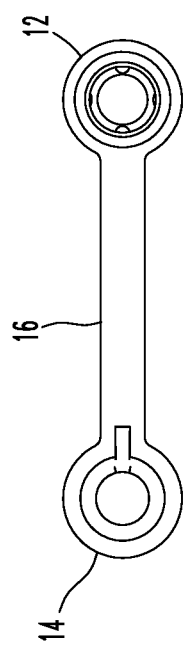
FIG. 4 is a plan view of the valve cap assembly shown in FIG. 1.
Figure 3:
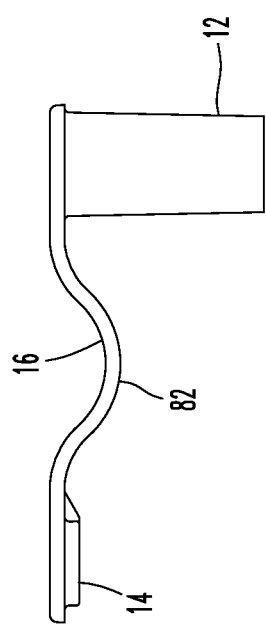
FIG. 3 is a side elevation view of the valve cap assembly shown in FIG. 1.
Figure 7:
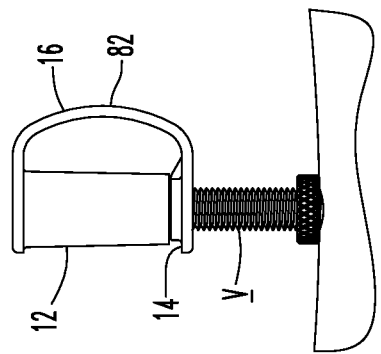
FIG. 7 is similar to FIG. 5 but illustrates the cap covering the end of the air valve.
Figure 6:
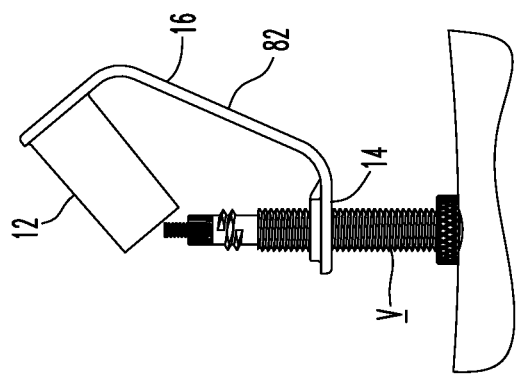
FIG. 6 is similar to FIG. 5 but illustrates the cap being positioned over the air valve.
Figure 5:
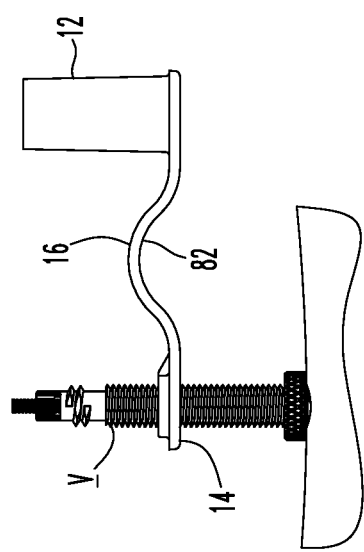
FIG. 5 illustrates the valve cap assembly shown in FIG. 1 attached to a Presta type air valve, the cap spaced from and not covering an end of the air valve.

FIGS. 1-4 illustrate a valve cap assembly 10 in accordance with this disclosure, and FIGS. 5-7 illustrate the valve cap assembly attached to a Presta type air valve V.

The valve cap assembly 10 includes a cap 12, a hoop 14, and a flexible tether 16 connecting the cap and the hoop. The illustrated valve cap assembly is formed as a one-piece, homogeneous body from a thermoplastic elastomer such as a thermoplastic polyurethane. The elastomer has sufficient elasticity to enable the cap and hoop to attach to and be retained on the air valve by interference fits with the air valve as described in more detail below.

The hoop 14 slides on the air valve V to attach the valve cap assembly 10 to an air valve. FIG. 5 illustrates the hoop attaching the valve cap assembly to an air valve V of a bicycle. The tether 16 retains the cap 12 with the hoop even when the cap is not placed over the end of the air valve.

FIGS. 6 and 7 illustrate placing the cap 12 on the end of the air valve V. The cap 12 is a hollow member having an open end that receives the end of the air valve into the cap as shown in FIG. 6. The tether 16 enables the cap and hoop to be selectively placed closer apart and further apart from one another as needed to move and place the cap on the air valve or to remove the cap from the air valve.

FIG. 7 illustrates the cap 12 covering the end of the air valve V. The cap receives a sufficient length of the air valve within the cap to secure the cap to the end of the air valve. The cap when covering the end of the air valve is spaced closely from the hoop 14 help resist entry of water, road dirt and the like into the cap.

Attachment of the valve cap assembly to the air valve V is described next.

To attach the valve cap assembly 10 to the air valve V, the hoop 14 is placed over the end of the air valve. The cap 12 is then placed over the hoop and the cap is used to push the hoop along the air valve until the end of the air valve is fully received inside the cap. This positions the hoop in its final installed position along the air valve as shown in FIG. 5. As will be explained in more detail below, both the cap and hoop have interference features that help hold the cap and hook to the air valve with interference fits while the bicycle is being ridden.

A detailed description of the valve cap assembly 10 is provided next.

FIGS. 8-10 illustrate the hoop 14. The hoop includes a tubular body 18 extending along and axisymmetric about an axis 20 that defines a radial direction perpendicular to the axis and a longitudinal direction parallel with the axis. The body includes a first end 22 and a longitudinally spaced apart opposite second end 24. A through-hole 26 extends from the first end to the second end and extends along and is surrounded by an annular inner surface 28 of the body ("annular" meaning extending completely around and being spaced from an axis to define a passage or hole).

The inner surface 28 defines a first portion 30 of the through-hole 26 extending axially from the second end 24, a second portion 32 extending axially from the first portion towards the first end 22, and a third portion 34 extending axially from the second portion to the first end 22.

A first portion of the inner surface 28 facing and defining the through-hole first portion 30 is a radiused surface 36 whereby the diameter of the through-hole 26 increases extending through the first portion 30 towards the second end 24. A second portion of the inner surface 28 facing and defining the through-hole second portion 32 has a narrowed throat is a constant diameter surface 38 whereby the through-hole 26 has a constant diameter throughout the second portion. A third portion of the inner surface 28 facing and defining the through-hole third portion 34 is a frustum-shaped surface 40 whereby the diameter of the through-hole 26 decreases extending through the third portion from the first end 22.

A protrusion 42 extends radially from the inner surface 28 into the through-hole 26, and extends longitudinally along the entire inner surface third portion 40 from the first end 22 to the inner surface second portion 38. The protrusion extends circumferentially along the inner surface third portion essentially the thickness of the protrusion and extends radially to an outer surface 44 that has the same radius as the inner surface second portion 38. The protrusion blends into the inner surface second portion 38, that is, there is no radial discontinuity of the inner surface 28 where the protrusion intersects the second inner surface second portion.

The hoop body 18 includes a radially enlarged collar 46 at the body second end 24. The collar extends longitudinally from the second end to about even with the start of the inner surface third portion 40. The tether 16 is attached to a collar portion 48 that is radially aligned with the hoop protrusion 42, that is, a plane extending from the axis 20 through the protrusion would intersect the collar portion 48.

The hoop 14 further includes an external rib 52 (see also FIG. 3) extending away from the body 18 and attached to the collar portion 48. The rib is generally triangle-shaped and includes a first side radially aligned with the protrusion 40 and extending radially along the collar portion, a second side extending longitudinally along the outside of the body 18 from the collar portion to the body first end 22, and a third side 52 extending from the body first end 22 to the collar portion 48. The thickness of the rib is about equal to the thickness of the protrusion 40.

Figure 11:
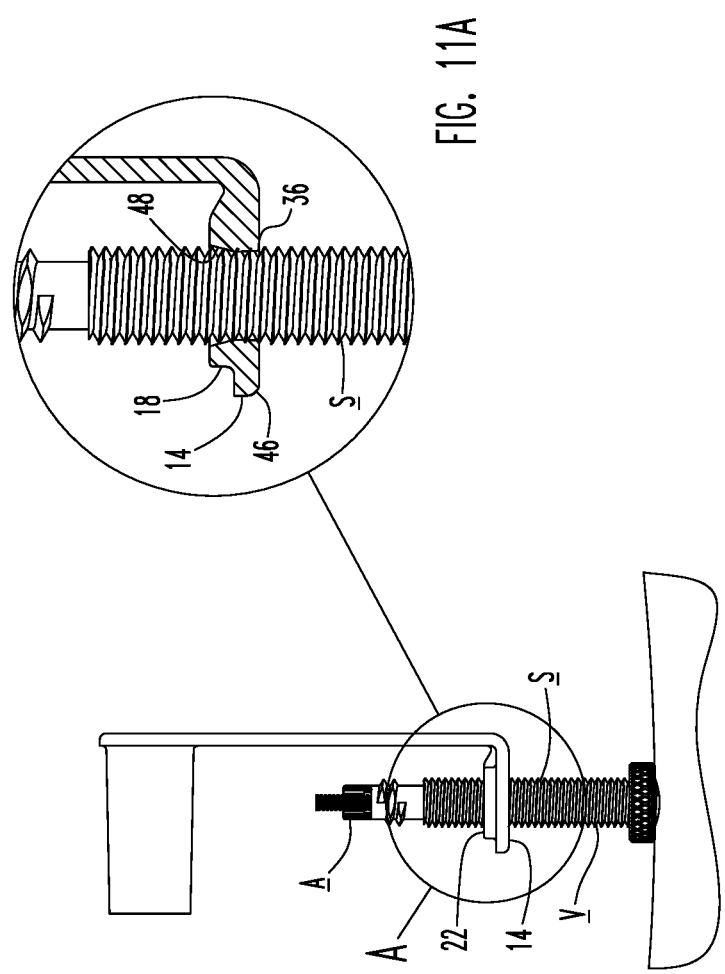
FIG. 11 is similar to FIG. 6.

FIGS. 11 and 11A is a more detailed view illustrating the hoop 14 being attached to the air valve V shown in FIG. 5, the hoop being at its installed position. The air valve is a Presta type air valve, Presta and Schrader type air valves being the most common air valve types used in bicycling. The illustrated air valve includes an externally threaded valve stem S and a reduced diameter valve assembly A disposed at the free end of the air valve. The valve stem has a standard 6V1 external thread; a table of standard bicycle air valve thread types per ISO 4570 is listed in Table 1:

TABLE 1

AIR VALVE THREAD TYPES

| Type | Thread Diameter (mm) | Thread Pitch (mm) |
|---|---|---|
| 5V1 | 5.2 | 0.706 |
| 5V2 | 5.2 | 1.058 |
| 6V1 | 6 | 0.794 |
| 8V2 | 7.7 | 0.794 |
| 8V2 | 7.9 | 1.058 |
| 9V1 | 9.4 | 0.794 |
| 10V1 | 9.6 | 1.058 |
| 10V2 | 10.3 | 0.907 |
| 11V1 | 11.1 | 1.27 |
| 11V2 | 12.2 | 0.997 |

As illustrated in FIG. 11, the hoop 14 is attached to the valve stem S with the end 22 of the hoop facing towards the free end of the valve stem V.

The radiused inner surface first portion 36 enables the hoop 14 to slide onto and over the valve stem external threads without hanging up regardless of manufacturing variations in the threads. The lack of radial discontinuity at the transition of the inner surface second portion 38 to the hoop protrusion 42 enables the protrusion to slide onto the valve stem external threads without hanging up against the valve stem.

The constant diameter inner surface second portion 38 is sized to form an interference fit with the valve stem S that reliably retains the hoop 14 on the valve stem at its installed position. The radial interference fit between the inner surface second portion and the valve stem is 0.25 millimeters (about one-hundredth of an inch). Radial expansion of the inner surface second portion 38 is resisted by the combined radial thicknesses of the hoop body 18 and the collar 46 to maximize the elastic force applied by the inner surface second portion against the valve stem. And as best shown in FIG. 11A, the constant diameter inner surface second portion 48 has a longitudinal length of about 1.412 millimeters (about 0.0556 inches) that is about equal to twice the thread pitch to assure the full interference fit is generated by the threads and is not effectively reduced by interactions with the thread valleys.

In other possible embodiments the inner surface second portion 48 may extend a longitudinal length about equal to three times the thread pitch (for example, 3.87 millimeters (about 0.152 inches) if attached to an 11V1 thread type).

The valve stem S also extends through the inner surface third portion 40 whereby the hoop protrusion 28 also forms an interference fit with the valve stem. Radial deflection of the hoop protrusion is resisted by the inner surface third portion 40 as well as the stiffening rib 50 so as to apply increased elastic force by the protrusion 42 as compared to that applied if the rib were absent.

The longitudinal length of the hoop protrusion 42 is about 1.5 times the thread pitch to assure the full interference fit is generated between the threads and the protrusion and is not effectively reduced by interactions with the thread valleys. The hoop protrusion stiffens the side of the hoop 14 and applies a force to the facing side of the valve stem S.

Furthermore, the combined longitudinal length of contact of the hoop protrusion 42 and the inner surface second portion 38 along the valve stem S assists in resisting rotational displacement of the hoop relative to the valve stem that might lessen resistance to the hoop sliding off the valve stem. Forces applied to the hoop urging relative rotation of the hoop relative to the valve stem can be generated by tension applied by the tether 16 to the hoop 14 or applied to the hoop by the user pulling on the cap 12 while removing the cap from the air valve V.

Figure 12:
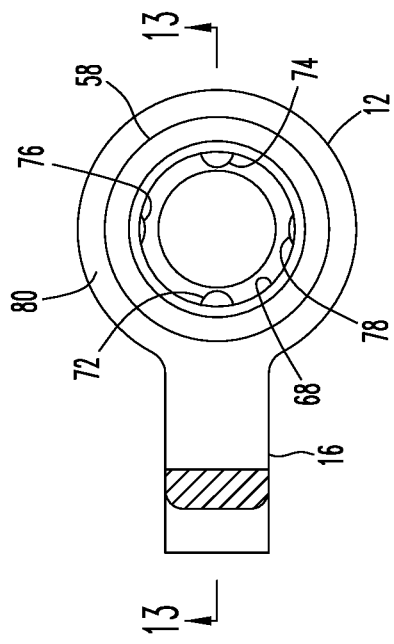
FIG. 12 is a plan view of the cap of the valve cap assembly shown in FIG. 4.
Figure 13:
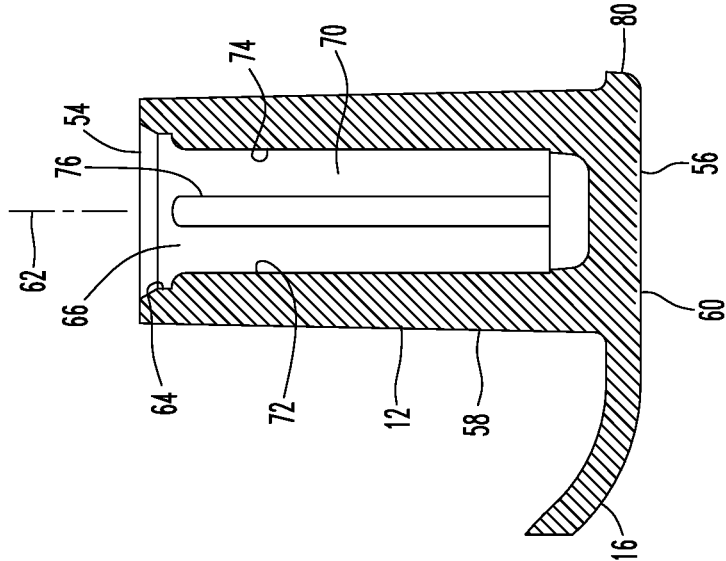
FIG. 13 is a sectional view taken along line 13-13 of claim 12.

FIGS. 12 and 13 illustrate the cap 12. The cap is hollow and extends from an open end 54 to a closed end 56. The cap includes an elongate tubular member 58 disposed at the open end of the cap and closed by an end wall 60 at the closed end of the cap. The tubular member extends along and is axisymmetric with an axis 62. The cap axis defines a radial direction perpendicular to the axis, a longitudinal direction parallel with the axis, and a circumferential direction about the axis. The tubular member includes an annular inner surface 64 that surrounds and defines a through-hole 66 extending along the axis.

The through-hole 66 is configured to receive the end of the Presta air valve V shown in FIG. 11. The inner surface 64 includes a uniform diameter inner surface first portion 68 that surrounds and defines a uniform diameter through-hole portion 70.

The cap 12 further includes a first pair of protrusions that include a first protrusion 72 and second protrusion 74, and a second pair of protrusions that include a third protrusion 76 and a fourth protrusion 78. As seen in FIG. 12, each protrusion has a rounded cross-section, extends a circumferential distance along the inner surface first portion 68, and extends radially into the through-hole 66 from the inner surface first portion 68. Each protrusion is also longitudinally elongate and extends longitudinally along substantially the length of the inner surface portion 68 for a distance substantially greater than the circumferential distance the protrusion extends along the inner surface first portion 68.

The first pair of protrusions 72, 74 face each other and are angularly spaced 180 degrees apart from one another along the axis 62, and the second pair of protrusions 76, 78 also face each other and are angularly spaced 180 degrees apart from one another. The first set of protrusions are angularly spaced 90 degrees apart from the second set of protrusions about the axis 62 whereby the four protrusions are equally angularly distributed about the axis.

The end wall 60 is attached to the tubular member and closes the adjacent end of the tubular member 58. The end wall 60 extends radially outwardly from the tubular member wall to define an exposed circular rim 80 (see also FIG. 1). The tether 16 is attached to a portion of the rim.

Referring back to FIGS. 1 and 3, the tether 16 is shown in those figures in an unstressed or unstretched state. The tether includes a molded-in intermediate arched or curved portion 82 that holds the cap 12 and the hoop 14 closer together when the valve cap assembly is unstressed as compared to when the arch is forced to extend along a straight line as can be seen comparing FIG. 5 and FIG. 6. In the illustrated embodiment the arch is formed to normally follow a substantially semi-circular path.

As shown in FIG. 6, the tether 16 can be elastically stretched to "flatten" the arch 82 and enable tether to extend substantially its fully developed linear length when placing the cap 12 on the end of the air valve V. After the cap is placed on the end of the air valve, the elasticity of the tether enables the tether to "unflatten", restoring the arch in the tether as shown in FIG. 7. There is sufficient remaining tension in the tether as shown in FIG. 7 whereby the arch urges the cap and the hoop 14 towards each other to assist in maintaining the tight clearance between the cap and hoop as shown in FIG. 7.

Figure 14:
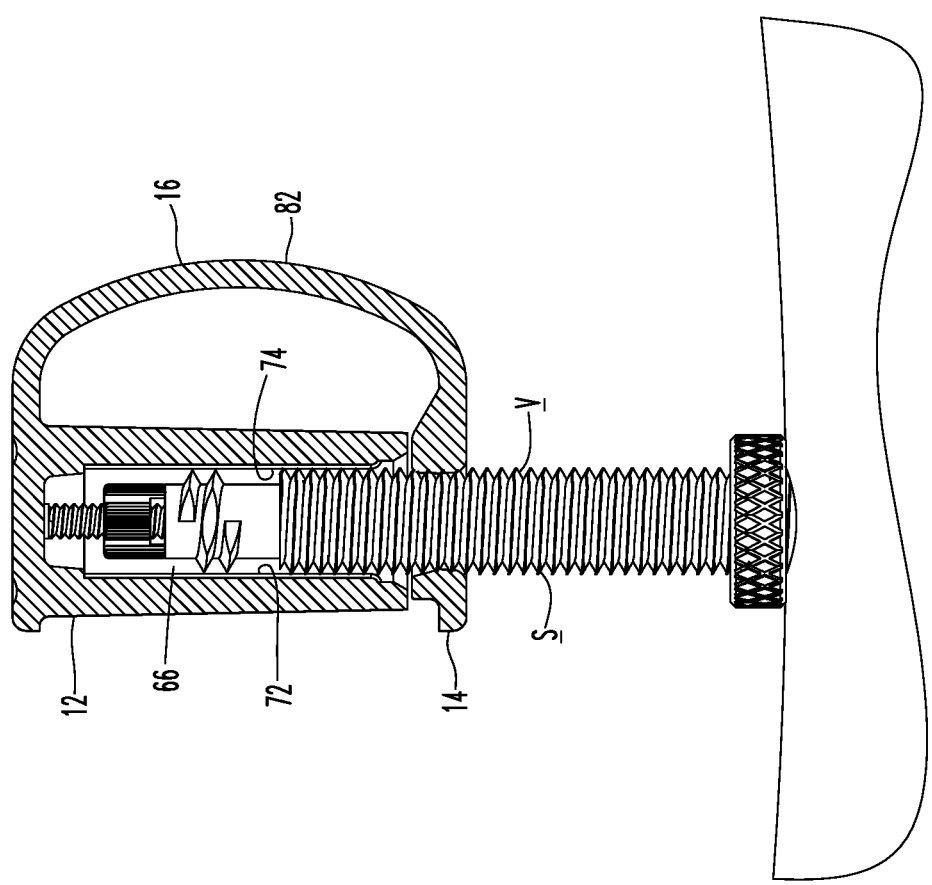
FIG. 14 is similar to FIG. 7 but illustrating the valve cap assembly in a sectional view.

FIG. 14 is a sectional view of FIG. 7 illustrating the cap 12 over the end of the air valve V. The end of the air valve is received in the cap through-hole 66. The cap annular inner surface 64 surrounds the end of the air valve and the uniform diameter inner surface portion 68 has sufficient longitudinal length to cover about seven times the thread pitch (or about 5.6 millimeters [about 0.22 inches]).

Each of the first pair of cap protrusions 72, 74 extend radially into the cap through-hole 66 a distance to generate at least a 0.25 millimeter interference fit between the cap and the air valve stem S.

In the illustrated cap the interference fit generated by the first pair of protrusions is sufficient to retain the cap on the air valve while riding the bicycle. Each of the second pair of cap protrusions 76, 78 extend radially into the cap through-hole 66 a lesser distance than the first pair of cap protrusions to generate a smaller interference fit with the valve stem to maintain alignment and resist cocking of the cap while on the air valve V. In other possible cap embodiments, the cap protrusions may extend radially into the cap through-hole the same distances.

As shown in FIG. 14, the tether 16 is connected to the cap 12 and the hoop 14 so that when the cap is covering the air valve V the tether extends axially along one side of the air valve, and the tether is aligned radially with the first pair of cap protrusions 72, 74. This enables a user to squeeze the cap for removing the cap along the sides of the cap radially aligned with the second pair of cap protrusions 76, 78 without obstruction from the tether. The user can squeeze the cap with opposing fingers and can press up against the cap rim 80 to assist in sliding the cap off the air valve.

Because the cap protrusions 72-74 are longitudinally elongate members, they essentially slide along the tops of the external threads of the air valve V without being caught between the thread valleys. This enables the cap to be placed on and off the air valve V without catching the external threads and therefore without having to yank the cap off the air valve to overcome catching of the cap protrusions with the external threads.

The cap protrusions 72-74 being longitudinally elongate and circumferentially spaced apart from one another enable air flow between the protrusions along the air valve V that prevents a vacuum or suction being generated that can resist a user attempting to place the cap on the air valve V or attempting to remove the cap from the air valve.

Presta-type air valves may have a uniform-diameter stem having an externally threaded stem portion adjacent the valve A and a smooth, unthreaded stem portion extending from the threaded stem portion to the tire. With such valves, the hoop can be located along the unthreaded stem portion when in its installed position, and the cap, when on the end of the air valve, can extend from the end of the air valve, past the threaded stem portion, and to the unthreaded stem portion. The cap protrusions can extend longitudinally far enough and be sized to form interference fits with both the externally threaded portion of the valve and the unthreaded portion of the valve. Each cap protrusion may extend a constant radial distance along its entire longitudinal length, or the radial distance may differ for the cap portion that will face the threaded portion of the valve as compared to that for the cap portion that will face the unthreaded portion of the valve when the cap is covering the end of the valve.

Figure 15:
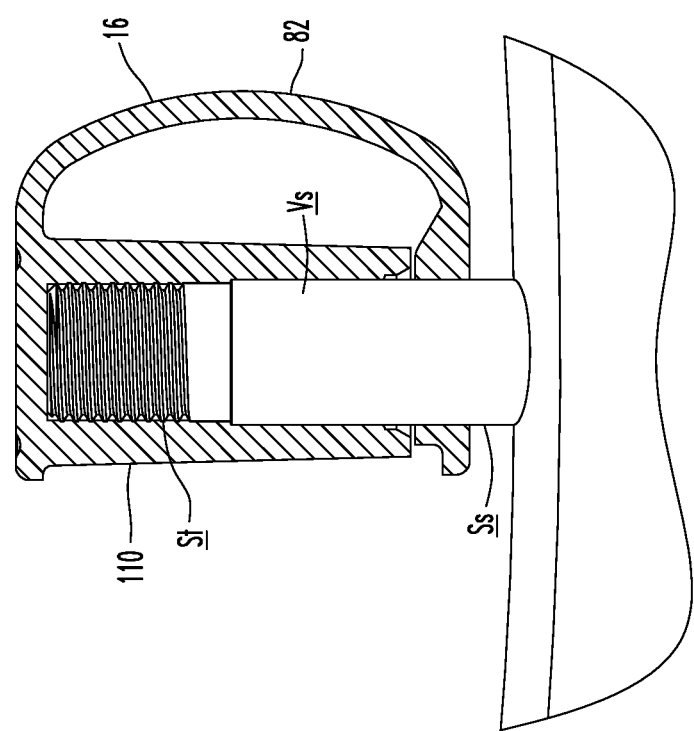
FIG. 15 is similar to FIG. 14 but illustrates a second embodiment valve cap assembly covering a Schrader type valve.

FIG. 15 illustrates a second embodiment valve cap assembly 110 attached to and covering an end of a Schrader type air valve Vs. The construction of the cap, hoop, and tether of the valve cap assembly 110 is similar to that of the first embodiment valve cap assembly but the cap and hoop are modified to fit over and form interference fits with both the threaded valve stem portion St and the unthreaded valve stem Ss of the air valve Vs. In this embodiment the cap protrusions define a 0.32 millimeter (about 0.013 inch) radial interference fit between the cap protrusions and the valve stem when the cap is covering the end of the air valve.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, interference fit and length of interference fit, number, arrangement, and cross-sectional profile of the cap protrusions or hoop protrusions (including but not limited to, circular, concave, convex, trapezoidal, and rectangular cross-sections), the length, shape, and flexibility of the tether, as well as such changes and alterations that fall within the purview of the following claims.

What is claimed is:

1. A valve cap assembly for being attached to a valve stem of an air valve and removably covering an end of the valve stem, the valve cap assembly comprising:

a cap, a hoop, and a tether;

the tether flexibly connecting the cap and the hoop while permitting the cap and hoop to be selectively placed closer apart and further apart from one another;

the hoop being configured to attach the valve cap assembly to an end of the valve stem, the hoop surrounding a through hole extending along a hoop axis between opposite and axially spaced apart first and second ends of the hoop, the hoop being open at the first and second ends, the hoop being configured to removably receive the valve stem through the through hole of the hoop to position the hoop along the valve stem, the hoop being configured to generate an interference fit between the hoop and the valve stem forming a releasable connection between the hoop and the valve stem to resist relative movement of the hoop along the valve stem when the hoop is positioned along the valve stem;

the cap being hollow and comprising a tubular member and an end wall, the tubular member being made of an elastic material and defining a through-hole extending along a cap axis between opposite and longitudinally spaced-apart first and second ends of the tubular member, the end wall closing the first end of the tubular member, the tubular member being open at the second end and being configured to removably receive the end of the air valve into the through hole, the tubular member comprising an annular inner surface facing the through hole and one or more protrusions extending away from the annular inner surface into the through hole, each of the one or more protrusions extending in a radial direction into the through hole to generate an interference fit between the cap and the air valve when the end of the air valve is received into the cap, each of the one or more protrusions extending in a circumferential direction along the inner surface, and each of the one or more protrusions extending in a longitudinal direction a distance substantially greater than the circumferential distance; and wherein each of the one or more protrusions of the cap comprise three or more protrusions angularly spaced apart from one another about the cap axis, the three or more protrusions comprising a first set of one or more protrusions of the three or more protrusions and a non-overlapping second set of one or more of the three or more protrusions, the one or more protrusions of the first set extending radially a first distance from the wall surface, the one or more protrusions of the second set extending radially a second distance from the wall surface, the second distance less than the first distance.

2. The valve cap assembly of claim 1 wherein each set of the first and second sets of protrusions consists of two protrusions, the two protrusions of the first set being disposed facing one another and the two protrusions of the second set being disposed facing one another.

3. A valve cap assembly for being attached to an air valve and removably covering an end of the air valve, the valve cap assembly comprising:

a cap, a hoop, and a tether;

the cap being a hollow member having an open end, the cap being configured to receive the end of the air valve through the open end to cover the end of the air valve and form an interference fit with the air valve when covering the end of the air valve;

the tether flexibly connecting the cap and the hoop while permitting the cap and hoop to be selectively placed closer apart and further apart from one another;

the hoop being made of an elastic material and being configured to attach the valve cap assembly to the air valve, the hoop comprising a through-hole extending along a linear axis between opposite and axially spaced apart first and second open ends of the hoop, the hoop being configured to removably receive the air valve through the through hole of the hoop to position the hoop along the air valve, the hoop comprising an annular inner wall extending along the linear axis facing and surrounding the through-hole, the annular inner wall comprising a narrowed annular wall portion being spaced inwardly from the first and second ends of the hoop and defining a narrowed portion of the through-hole, the narrowed annular wall portion being configured to generate an interference fit with the air valve and thereby form a releasable connection between the hoop and the air valve to resist relative movement of the hoop along the air valve when the hoop is installed on the air valve; and wherein the hoop comprises a protrusion extending from the annular inner wall into the through-opening, the protrusion being disposed between the first and second ends of the hoop and being configured to cooperate with the narrowed annular wall portion of the hoop to generate the interference fit between the air valve and the hoop when the hoop is installed on the air valve.

4. A valve cap assembly for being attached to an air valve and removably covering an end of the air valve, the valve cap assembly comprising:

a cap, a hoop, and a tether;

the cap being a hollow member having an open end, the cap being configured to receive the end of the air valve through the open end to cover the end of the air valve and form an interference fit with the air valve when covering the end of the air valve;

the tether flexibly connecting the cap and the hoop while permitting the cap and hoop to be selectively placed closer apart and further apart from one another;

the hoop being made of an elastic material and being configured to attach the valve cap assembly to the air valve, the hoop comprising a through-hole extending between opposite and axially spaced apart first and second open ends of the hoop, the hoop being configured to removably receive the air valve through the through hole of the hoop to position the hoop along the air valve, the hoop comprising an annular inner surface facing and surrounding the through-hole, the through-hole having a narrowed portion being spaced from the first and second ends of the hoop, the portion of the inner surface surrounding the narrowed portion of the through-hole being configured to generate an interference fit with the air valve and thereby form a releasable connection between the hoop and the air valve to resist relative movement of the hoop along the air valve when the hoop is installed on the air valve;

the hoop further comprising a protrusion extending from the inner surface into the through-opening, the protrusion being configured to cooperatively generate the interference fit with the air valve when the hoop is installed on the air valve; and the hoop further comprising an enlarged collar disposed at the second end of the hoop and the tether is attached to the collar, the tether being attached to a portion of the collar that is adjacent to the hoop protrusion, and the hoop comprises a rib being attached both to an outer surface of the hoop and to the collar, the rib being radially aligned with the hoop protrusion to resist radial deformation of the hoop protrusion when generating the interference fit between the hoop and the air valve.

5. The valve cap assembly of claim 4 wherein the rib is shaped as a triangle, one side of the triangle extending from the first end of the hoop towards the collar as the rib extends away from the hoop.

6. A valve cap assembly for being attached to an air valve and removably covering an end of the air valve, the valve cap assembly comprising:

a cap, a hoop, and a tether;

the cap being a hollow member having an open end, the cap being configured to receive the end of the air valve through the open end to cover the end of the air valve and form an interference fit with the air valve when covering the end of the air valve;

the tether flexibly connecting the cap and the hoop while permitting the cap and hoop to be selectively placed closer apart and further apart from one another;

the hoop being made of an elastic material and being configured to attach the valve cap assembly to the air valve, the hoop comprising a through-hole extending along a linear axis between opposite and axially spaced apart first and second open ends of the hoop, the hoop being configured to removably receive the air valve through the through hole of the hoop to position the hoop along the air valve, the hoop comprising an annular inner wall extending along the linear axis facing and surrounding the through-hole, the annular inner wall comprising a narrowed annular wall portion being spaced inwardly from the first and second ends of the hoop and defining a narrowed portion of the through-hole, the narrowed annular wall portion being configured to generate an interference fit with the air valve and thereby form a releasable connection between the hoop and the air valve to resist relative movement of the hoop along the air valve when the hoop is installed on the air valve; and wherein the hoop comprises an enlarged collar and a rib, the collar being disposed at the second end of the hoop, the rib being attached to both an outer surface of the hoop and to the collar, the rib resisting radial deformation of the hoop generating the interference fit between the hoop and the air valve.

7. A valve cap assembly for being attached to an air valve and removably covering an end of the air valve, the valve cap assembly comprising:

a cap, a hoop, and a tether;

the cap being a hollow member having an open end, the cap being configured to receive the end of the air valve through the open end to cover the end of the air valve and form an interference fit with the air valve when covering the end of the air valve;

the tether flexibly connecting the cap and the hoop while permitting the cap and hoop to be selectively placed closer apart and further apart from one another;

the hoop being made of an elastic material and being configured to attach the valve cap assembly to the air valve, the hoop comprising a through-hole extending between opposite and axially spaced apart first and second open ends of the hoop, the hoop being configured to removably receive the air valve through the through hole of the hoop to position the hoop along the air valve, the hoop comprising an annular inner surface facing and surrounding the through-hole, the through-hole having a narrowed portion being spaced from the first and second ends of the hoop, the portion of the inner surface surrounding the narrowed portion of the through-hole being configured to generate an interference fit with the air valve and thereby form a releasable connection between the hoop and the air valve to resist relative movement of the hoop along the air valve when the hoop is installed on the air valve;

the hoop comprising an enlarged collar and a rib, the collar being disposed at the second end of the hoop, the rib being attached to both an outer surface of the hoop and to the collar, the rib resisting radial deformation of the hoop generating the interference fit between the hoop and the air valve; and wherein the rib is shaped as a triangle, one side of the triangle extending from the first end of the hoop towards the collar as the rib extends away from the hoop.

8. The valve cap assembly of claim 7 wherein the tether is attached to an outer periphery of a portion of the collar, the rib also being attached to the portion of the collar.

9. A valve cap assembly for being attached to an air valve and removably covering an end of the air valve, the valve cap assembly comprising:
- a cap, a hoop, and a tether;
- the tether flexibly connecting the cap and the hoop while permitting the cap and hoop to be selectively placed closer apart and further apart from one another;
- the tether comprising an arch portion, the arch portion being curved when the tether is unstretched; and
- the cap comprising an open end and the hoop is attached to the air valve, the tether being configured such that the arch can flatten to provide sufficient distance between the open end of the cap and the end of the air valve to place the cap over the end of the air valve.

10. The valve cap assembly of claim 9 wherein the tether urges the cap and hoop towards one another when the cap is covering the end of the air valve.

11. The valve cap assembly of claim 10 wherein the cap is covering the end of the air valve, and the arch portion of the tether is curved and is located between the cap and the hoop alongside a side of the air valve.

* * * * *